United States Patent
Huang et al.

(10) Patent No.: US 8,660,089 B2
(45) Date of Patent: Feb. 25, 2014

(54) METHOD FOR RESELECTION AMONG HOME BASE STATION CELLS

(75) Inventors: Yada Huang, Shenzhen (CN); Zhongda Du, Shenzhen (CN)

(73) Assignee: ZTE Corporation, Shenzhen (CN)

(*) Notice: Subject to any disclaimer, the term of this patent is extended or adjusted under 35 U.S.C. 154(b) by 190 days.

(21) Appl. No.: 13/140,416

(22) PCT Filed: Jul. 22, 2009

(86) PCT No.: PCT/CN2009/072879
§ 371 (c)(1),
(2), (4) Date: Jun. 16, 2011

(87) PCT Pub. No.: WO2010/078747
PCT Pub. Date: Jul. 15, 2010

(65) Prior Publication Data
US 2011/0255509 A1    Oct. 20, 2011

(30) Foreign Application Priority Data
Jan. 6, 2009 (CN) .......................... 2009 1 0076214

(51) Int. Cl.
*H04W 4/00* (2009.01)
(52) U.S. Cl.
USPC ........... 370/331; 370/328; 370/332; 455/434; 455/436
(58) Field of Classification Search
USPC .......... 370/235–315, 322–331; 455/404–437, 455/443–525
See application file for complete search history.

(56) References Cited

U.S. PATENT DOCUMENTS

| | | | |
|---|---|---|---|
| 6,334,052 B1 | 12/2001 | Nordstrand | |
| 7,978,645 B2* | 7/2011 | Koo et al. | 370/328 |

(Continued)

FOREIGN PATENT DOCUMENTS

| | | |
|---|---|---|
| CN | 1852559 | 10/2006 |
| CN | 101064943 | 10/2007 |

(Continued)

OTHER PUBLICATIONS

Huawei acting as Rapporteur, Email report for E-mail discussion on "Home-(e)NB mobility, main issues" [63_LTE_C01]for the 3GPP TSG-RAN2 Meeting #63bis; Document No. R2-085705. Publisher: 3GPP. Sep. or Oct. 2008. Internation Document to 3GPP.ORG.

(Continued)

*Primary Examiner* — Man Phan
(74) *Attorney, Agent, or Firm* — Oppedahl Patent Law Firm LLC (57) ABSTRACT

The present invention discloses a method for reselection among home base station cells, which comprises the following steps that: a user terminal camps on a Closed Subscriber Group (CSG) cell (S101); when a closed subscriber group cell on a frequency is found meeting a reselection condition, the frequencies of the source closed subscriber group cell and a target closed subscriber group cell are assigned with the same frequency priority (S102), and the user terminal performs the cell reselection (S103). With a modified reselection policy, the present invention can implement effective reselection, significantly improve the signal quality of the user terminal, and solve the problem that the priorities of CSG cells cannot be guaranteed to be the same when a user terminal carries out reselection based on the priority-based reselection method by assigning the frequencies of the accessible CSG cells with the same priority.

7 Claims, 3 Drawing Sheets

(56) References Cited

U.S. PATENT DOCUMENTS

| | | | |
|---|---|---|---|
| 8,000,706 B2* | 8/2011 | Lee et al. | 455/435.2 |
| 8,121,602 B2* | 2/2012 | Yi et al. | 455/436 |
| 8,125,956 B2* | 2/2012 | Reddy et al. | 370/331 |
| 8,229,432 B2* | 7/2012 | Fox et al. | 455/435.3 |
| 8,280,377 B2* | 10/2012 | Lee et al. | 455/436 |
| 2008/0261600 A1* | 10/2008 | Somasundaram et al. | 455/436 |
| 2009/0067386 A1* | 3/2009 | Kitazoe | 370/332 |
| 2009/0088160 A1* | 4/2009 | Pani et al. | 455/436 |
| 2010/0081438 A1* | 4/2010 | Callender et al. | 455/436 |
| 2010/0222055 A1* | 9/2010 | Cho et al. | 455/434 |
| 2010/0273485 A1* | 10/2010 | Huang et al. | 455/435.3 |
| 2011/0053597 A1* | 3/2011 | Lee et al. | 455/436 |

FOREIGN PATENT DOCUMENTS

| | | | |
|---|---|---|---|
| JP | 2003534675 A | | 11/2003 |
| JP | 2004120112 A | | 4/2004 |
| JP | 2004153311 A | | 5/2004 |
| KR | 20060098729 | | 9/2006 |
| RU | 2287901 C1 | | 11/2006 |
| WO | 9839940 | | 9/1998 |
| WO | 2008030956 A2 | | 3/2008 |
| WO | 2008081816 A1 | | 7/2008 |
| WO | 2008113300 | | 9/2008 |

OTHER PUBLICATIONS

International Search Report for related PCT/CN2009/072879 mailed on Oct. 15, 2009.

IPRP/WO for related PCT/CN2009/072879 mailed on Oct. 15, 2009.

3GPP TS 25.367 V8.0.0 Dec. 2008.

Parameter for HNB White List Cell Selection Aug. 18-22, 2008.

* cited by examiner

METHOD FOR RESELECTION AMONG HOME BASE STATION CELLS

CROSS-REFERENCE TO RELATED APPLICATIONS

This application is the U.S. National Stage of International Patent Application No. PCT/CN2009/072879 filed on Jul. 22, 2009, which claims priority to Chinese Patent Application Number 200910076214.6 filed on Jan. 6, 2009, the disclosures of which are hereby incorporated by reference in their entireties.

TECHNICAL FIELD

The present invention relates to the field of reselection technologies among home base station cells, and in particular to a method for reselection among home base station cells in a wireless communication system.

BACKGROUND

Indoor coverage is of extremely high importance in the construction of a modern wireless network system, a proper indoor coverage solution can, on one hand, maximize the effect of a network and thereby create more value for operators, and on the other hand, it greatly lower the network construction cost of the operator to really achieve a high return at a low cost. At present, more and more transnational operators hope that a one-stop wireless access solution can be provided, so that such wireless access device can provide various wireless access functions and the operators can provide discount on the cost when the wireless access device is used by a subscriber at home, based on such a demand, a novel wireless access device, that is, home base station, is developed. Home base station, as an access solution to a novel wireless access device, can skillfully combine two communication means of a fixed network and a mobile network in a private location such as home, to meet demands of both the subscriber and operator by making full use of the advantages of the two networks.

As one kind of base stations, home base station is deployed in a home, a group, an enterprise or a school and other private locations as a dedicated resource for the use of private subscribers, and several cells covered by a home base station form a home base station coverage area. Different from common base stations that provide all subscribers services, a home base station only allows the access of an authorized subscriber such as a family member or group member and only provides services for such subscribers. A cell covered by a home base station only provides services for part of authorized subscribers and is therefore called a Closed Subscriber Group (CSG) cell, that is, a home base station cell is a CSG cell, which indicates to a user terminal its identity information that it is a CSG cell by carrying a CSG indicator in a broadcast message. There are two types of user terminals: CSG user terminals supportive to the capability of a CSG and Non-CSG user terminals unsupportive to the capability of a CSG, wherein a Non-CSG user terminal will not camp on a CSG cell, while a CSG user terminal can only camp on an authorized CSG cell but not an unauthorized CSG cell. A CSG user terminal stores the identities of CSG cells allowable to camp in a list of a USIM card which is called a white list so as to confirm whether it can camp on a desired cell by searching the whist list for the cell identity of the cell. When it is expanded to be used in a public location such as a school, plant and park, a CSG cell can also run in an open mode or a hybrid mode to allow an unauthorized user terminal to use the resources of the cell.

On the one hand, in a cellular mobile communication system, handover and cell reselection both play an extremely important role, specifically, when a user terminal leaves a cell for another cell, the intensity of the signal from the original cell which is received by the user terminal becomes weaker and weaker while that of the signal from the new entered cell which is received by the user terminal becomes stronger and stronger. In order to guarantee the quality of signal received by the user terminal, the user terminal must handoff from the original base station to the new entered base station with stronger signal intensity. For a user terminal in a connected state, such a handoff between base stations is known as handover, however, for a user terminal in an idle state, the change of a cell for a residence is completed through a cell reselection which is achieved by detecting the cells to be reselected, that is, the target cells, and performing a cell reselection among the target cells meeting requirements. As a CSG cell is advantaged in cost and the load on a common cell, that is, a macro cell, is also greatly reduced, therefore a CSG user terminal supportive to the capability of a CSG will camp on an authorized CSG cell as long as possible. A CSG user terminal can manually or automatically initiate a search for a CSG cell. A network operator reserves, during a network planning, part of physical resources such as Physical Cell Identity (PCI) for the dedicated use of a CSG cell and informs a CSG user terminal of this configuration in such manner as broadcast or signaling. And the CSG user terminal can determine whether the cell is a CSG cell by scanning a physical layer.

On the other hand, the quality of the signal received by a user terminal is measured by the user terminal, in order to save the power consumption of the user terminal, the target cells to be measured should be decreased to the least, and in a modern wireless cellular system, a measurement policy for the cell reselection of a user terminal is a cell measurement policy based on a frequency priority. The operator divides all frequencies into several groups during the network planning of a cell and allocates a priority to each group. Each cell broadcasts the priority of its own frequency and that of the frequency of a neighboring cell. A user terminal is required to be on a frequency of a higher priority as long as possible. Specifically, the frequency priority based cell measurement rule for a user terminal is as follows: first, a periodic measurement is performed on a neighboring cell on a frequency with a priority higher than that of the frequency of the cell where the user terminal camps; then, only if the signal quality of the serving cell is lower than a threshold, an intra-frequency neighboring cell is measured, otherwise, the user terminal may perform no measurement; and at last, only if the signal quality of the serving cell is lower than the threshold, a neighboring cell with the same or a lower frequency priority than the that of cell where the user terminal camps is measured, otherwise, the user terminal may perform no measurement.

Therefore, existing reselection method, that is, existing priority-based reselection method, involves the following contents in two aspects: on the one hand, the method relates to a reselection condition, which defines that the value $S_{nonServingCell,x}$ of a cell on a frequency to be measured is always greater than a threshold $Thresh_{x,high}$ within a period of time "$Treselection_{RAT}$", wherein "x" represents a frequency to be measured, "nonServingCell" represents a cell to be measured, $S_{nonServingCell,x}$ represents a cell selection receiving level value of the cell to be measured, "$Treselection_{RAT}$"

represents a cell reselection measurement time, and $Thresh_{x,high}$ represents a threshold for reselection on a frequency of a high priority; and on the other hand, the method relates to a reselection method based on the reselection condition, the specific processing process of the reselection method is described below:

the priority-based reselection method comprises the following steps:

101: reselecting a cell if the cell on a frequency of a high priority meets the reselection condition and a user terminal has camped on the current camped cell for more than 1 second;

step 101 here is aimed at a cell on a frequency of a high priority, therefore, reselection can be implemented in this step as long as the cell meets the reselection condition;

102: if no cell can be reselected on the resident frequency and there is no cell on a frequency of a high priority meeting the reselection condition, and if the measurement level $S_{ServingCell}$ of the resident cell is lower than the threshold $Thresh_{serving,low}$, a measured cell is reselected if the value $S_{nonServingCell,x}$ of the measured cell on a frequency of a low priority is always greater than the threshold $Thresh_{x,low}$ within a period of time "$Treselection_{RAT}$", wherein the x-represented measured frequency refers specifically to a measured frequency of a low priority, cell selection receiving level value of the measured cell represented by $S_{nonServingCell,x}$ refers specifically to the measurement level value of the measured cell, "$Treselection_{RAT}$" represents a cell reselection measurement time; $Thresh_{serving,low}$ represents a low level threshold of the residence cell, and $Thresh_{x,low}$ represents a threshold for reselection on a frequency of a low priority;

step 102 here is mainly aimed at a case where there is no cell available on a frequency of the same or a higher priority, and reselection is implemented to reselect a cell on a frequency of a lower priority;

103: reselection is carried out among the intra-frequency cells and the cells on frequencies with the same priority using an offset-based cell reselection method;

step 103 here is aimed at a case where the cells on frequencies of the same priority are on the same or different frequencies, or this step can be appreciated as reselection implemented among multiple cells using an offset-based cell reselection method;

and 104, if there are multiple cells meeting the reselection condition on the same frequency or on multiple frequencies with the same priority, the user terminal selects the optimal cell as the reselected target cell;

step 104 here is also aimed at a case where there are multiple cells, and in this step the optimal cell is selected for a reselection.

It should be noted here that the steps 101 to 104 stress on different points: steps 101 and 102 stress on the selection of cells, and steps 103 and 104 stress on the selection of the frequency order of the cells under the condition that the cells are selected. That is, a reselection solution can be composed of steps 101, 102 and 103, or be composed of steps 101, 102 and 104.

In conclusion, the selection of an optimal cell on a frequency is implemented by an offset-based ordering method, wherein $R_s = Q_{meas,s} + Qhyst_s$, $Rn = Q_{meas,n}$ Qoffset, wherein "s" represents a residence cell, "n" represents a neighboring cell, $Q_{meas,s}$ represents the measurement level of the residence cell during a reselection process, $Q_{meas,n}$ represents the measurement level of the neighboring cell during a reselection process, $Qhyst_s$ represents the hysteresis of a serving cell, Qoffset represents the level offset value of the neighboring cell, which is equal to $Qoffset_{s,n}$ as to the intra-frequency neighboring cells of the camped cell, there is $Qoffset = Qoffset_{s,n}$, while as to inter-frequency neighboring cells, there is $Qoffset = Qoffset_{s,n} + Qoffset_{frequency}$, $Qoffset_{s,n}$ represents an offset of a cell grade, and $Qoffset_{frequency}$ represents an offset of a frequency grade. The user terminal ranks all R values, the cell with the R value ranking first is the optimal cell, and then the user terminal reselects the optimal cell. Because the reselection of a neighboring cell depends on the value of the Qoffset in addition to the wireless quality of the cell, this method is also called an offset-based cell reselection method.

As the setting of a CSG cell is unpredictable for a macro cell, that is, it remains unknown, during the network planning of a macro cell, how many CSG cells neighbor the macro cell and which frequencies these CSG cell will be on. During establishment of the CSG cell, in order to achieve the best effect and cause the least interference to a neighboring cell, a CSG cell will scan all frequencies to find the one with the minimum inference. Therefore, a CSG cell may appear on any allowable frequency which may be a frequency of a cell neighboring a macro cell or another independent frequency. In this case, if the CSG user terminal still carries out reselection using the above priority-based reselection method, it will be difficult for the CSG user terminal to reselect to a CSG cell when the CSG cell is just on a frequency of the same or a lower priority, therefore, for a CSG cell, another reselection rule is regulated as follows:

as to the reselection rule of a CSG cell, in the case of reselection from a non-CSG cell to a CSG cell, that is, a CSG user terminal camping on a non-CSG cell automatically searches for a CSG cell and reselects, if a proper CSG cell is found which has the best wireless quality on its frequency, the CSG cell to reside in, regardless of the original priority of the frequency. This reselection rule is also known as an implicit priority rule.

And in the case where a CSG user terminal camps on a proper CSG cell, the user terminal considers the priority of the frequency of the CSG cell highest, and reselects a cell using the aforementioned priority-based reselection method during cell reselection. Then, according to the aforementioned frequency priority based cell measurement rule for a user terminal, a CSG user terminal camping on a CSG cell performs no other measurement when the wireless signal quality of a cell is higher than an intra-frequency measurement threshold or an inter-frequency measurement threshold, which greatly lowers the power consumption of the user terminal in a standby state.

However, based on the description above, when camping on a CSG cell, a CSG user terminal considers the priority of the frequency of the cell highest (higher than that of any neighboring frequency), which leads to problems in two aspects: 1, the CSG user terminal considers itself on the frequency of the highest frequency priority, making it difficult to reselect another proper CSG cell on another frequency; 2, as the user terminal camping on a CSG cell follows the aforementioned priority-based reselection method during cell reselection, thus the CSG cells on the frequencies that are assigned with frequency priorities in a cell broadcast have different priorities. In brief, as CSG cells are unequal in status to each other and each have a priority that is considered by default highest, and the priority-based reselection method is a method according to the reselection which is implemented based on the order of the priorities (from the highest priority to the lowest priority) to reselect a target cell on the frequency of the highest priority for a user terminal to camp on, therefore it is difficult to realize an effective reselection using the existing reselection policy, leading to a poor signal quality of the user terminal.

SUMMARY

In order to solve the problem that it is difficult to realize an effective reselection using the existing reselection policy, which leads to the poor signal quality of a user terminal, the present invention mainly aims to provide a method for reselection among home base station cells, which guarantees the equal status of CSG cells and assigns the frequencies of the source CSG cell and the target CSG cell to be reselected with the same priority and thereby realizes an effective reselection and enhances the signal quality of the user terminal.

In accordance with the present invention, there is provided a method for reselection among home base station cells.

A method for reselection among home base station cells according to the present invention comprises:

a user terminal camps on a CSG cell; when the user terminal is reassociated from a current camped source CSG cell to a target CSG cell, the frequencies of the source CSG cell and the target CSG cell are assigned with the same frequency priority, and the user terminal performs the cell reselection.

Preferably, the source CSG cell and the target CSG cell both may allow the user terminal to camp on and both may comprise CSG cells belonging to cells listed in the white list of the user terminal or CSG cells accessible to an unauthorized user terminal.

Preferably, the source CSG cell and the target CSG cell may have the same or different CSG identities.

Preferably, the user terminal may comprise a CSG user terminal supportive to the capability of a CSG.

Preferably, the frequency of the target CSG cell may be a frequency different from that of the source CSG cell.

Preferably, the frequency priority of the target CSG cell may be a frequency reselection priority broadcasted by the source CSG cell on which the user terminal currently camps.

Preferably, the source CSG cell and the target CSG cell may be assigned with the same frequency priority in the following specific frequency priority configuration way: frequency priorities are set based on the fact that the frequencies of source CSG cell and the target CSG cell are assigned with the same frequency priority which is higher than those of other frequencies.

Preferably, the other frequencies may refer to the frequencies excluding those of the source CSG cell and the target CSG cell; or the other frequencies may be appreciated as frequencies on which no CSG cell exists or on which no CSG cell meets the reselection condition.

Preferably, the step of the user terminal performing the cell reselection may be specifically comprise: the cell reselection is performed by reassociating the user terminal from the source CSG cell to the target CSG cell through a cell reselection using an offset-based cell reselection method.

The method of the present invention comprises: a user terminal camps on a CSG cell; frequency priorities are set when the user terminal reselects to a target CSG cell from the current camped source CSG cell; the frequencies of the source CSG cell and the target CSG cell are assigned with the same frequency priority; and the user terminal reselects to the target CSG cell from the source CSG cell.

By guaranteeing the equal status of CSG cells, assigning the source CSG cell and the target CSG cell to be reselected with the same priority (frequency priority), and realizing effective reselection using a modified reselection policy and the aforementioned priority-based reselection method, the present invention enhances the signal quality of a user terminal. In other words, the present invention solves the problem that the priorities of CSG cells cannot be guaranteed to be the same when a user terminal camping on a CSG cell implements reselection using a priority-based reselection method by assigning accessible CSG cells with the same priority.

BRIEF DESCRIPTION OF THE DRAWINGS

The accompanying drawings illustrated herein are provided for a further understanding of the present invention and form a part of this disclosure, and the exemplary embodiments of the present invention and the description thereof are for explaining the present invention but not constituting improper limitation to the present invention. In the accompanying drawings.

DETAILED DESCRIPTION

Function Overview

Considering the problem that it is difficult to realize an effective reselection using the existing reselection policy which leads to the poor signal quality of a user terminal, the present invention provides a method for reselection among home base station cells, frequency priorities are set when a user terminal performs reselection from the current camped source CSG cell to a target CSG cell, the frequencies of the source CSG cell and the target CSG cell are assigned with the same frequency priority, and the user terminal is reassociated from the source CSG cell to the target CSG cell through a cell reselection.

The present invention is described below in detail by reference to the accompanying drawings in conjunction with exemplary embodiments. It should be noted that the embodiments of the present invention and the features thereof can be combined with each other if no conflict is caused.

Figure 1:
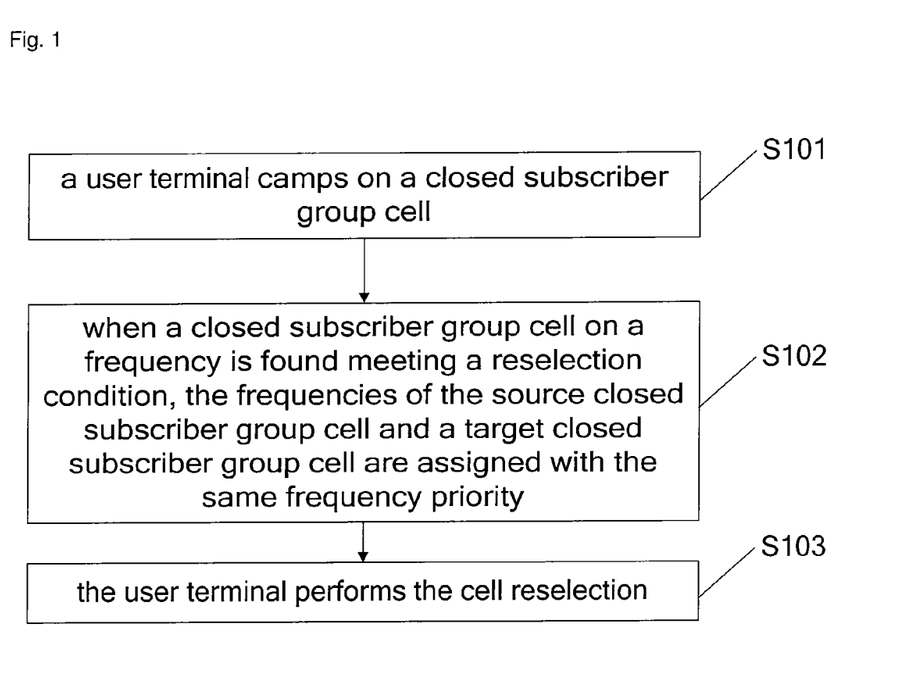
FIG. 1 is a flow chart illustrating a method for reselection among home base station cells according to an embodiment of the present invention.

FIG. 1 is a flow chart illustrating a method for reselection among home base station cells according to an embodiment of the present invention, as shown in FIG. 1, the method comprises the following steps 101-103:

101: a user terminal camps on a CSG cell;
the CSG cell herein is a home base station cell;
102: the frequencies of the source CSG cell and the target CSG cell are assigned with the same frequency priority when a CSG cell on a frequency is found meeting a reselection condition;

in the steps 101 and 102, the source CSG cell and the target CSG cell herein both allow the user terminal to camp on and both comprise the CSG cells belonging to the cells listed in the white list of the user terminal or the CSG cells accessible to an unauthorized user terminal, such as a CSG cell belonging to the user terminal which is accessible to an authorized user terminal in an open mode; that is, the source CSG cells and the target CSG cells can be the CSG cells listed in the white list of the user terminal or CSG cells accessible to any user terminal;

the source CSG cell and the target CSG cell here may have the same or different CSG identities; the user terminal comprises a CSG user terminal supportive to the capability of a CSG;

here, the frequency of the target CSG cell is a frequency different from that of the source CSG cell, that is, the other frequencies are those excluding that of the source CSG cell;

here, the frequency priority of the target CSG cell refers to a frequency reselection priority broadcasted by the source CSG cell on which the user terminal currently camps; it should be noted that a user terminal camping on a CSG cell and performing reselection to a target CSG cell on another frequency considers that the source CSG cell and the target CSG cell have the same frequency priority, regardless of the original frequency priority of the target CSG cell, wherein the original frequency priority of the target CSG cell refers to the priority of the frequency of the target CSG cell involved herein;

here, the source CSG cell and the target CSG cell can be configured with the same frequency priority in the following specific frequency priority configuration way: frequency priorities are set based on the fact that the source CSG cell and the target CSG cell are set with the same frequency priority, and the priority of the same frequency is set to be higher than those of other frequencies, wherein other frequencies refer to the frequencies excluding those of the source CSG cell and the target CSG cell, or can be appreciated as frequencies on which no CSG cell exists or on which no CSG cell meets the reselection condition;

103: the user terminal performs the cell reselection, for example, the user terminal is reassociated from the source CSG cell to the target CSG cell through a cell reselection.

It should be noted that in step 103, the user terminal is reassociated from the source CSG cell to the target CSG cell through a cell reselection using the aforementioned existing priority-based reselection method; compared to the prior art, the present invention modifies the reselection policy, and the modified reselection policy is as follows: equal status of CSG cells is guaranteed and the frequencies of the source CSG cell and the target CSG cell to be reselected are assigned with the same priority, wherein the priority herein refers to a frequency priority, and reselection is effectively realized by the priority-based reselection method and the modified reselection policy. For example, the step of making the user terminal reselect to the target CSG cell from the source CSG cell may be specifically: the cell reselection is performed after the cells are ranked by an offset-based cell reselection method.

Figure 2:
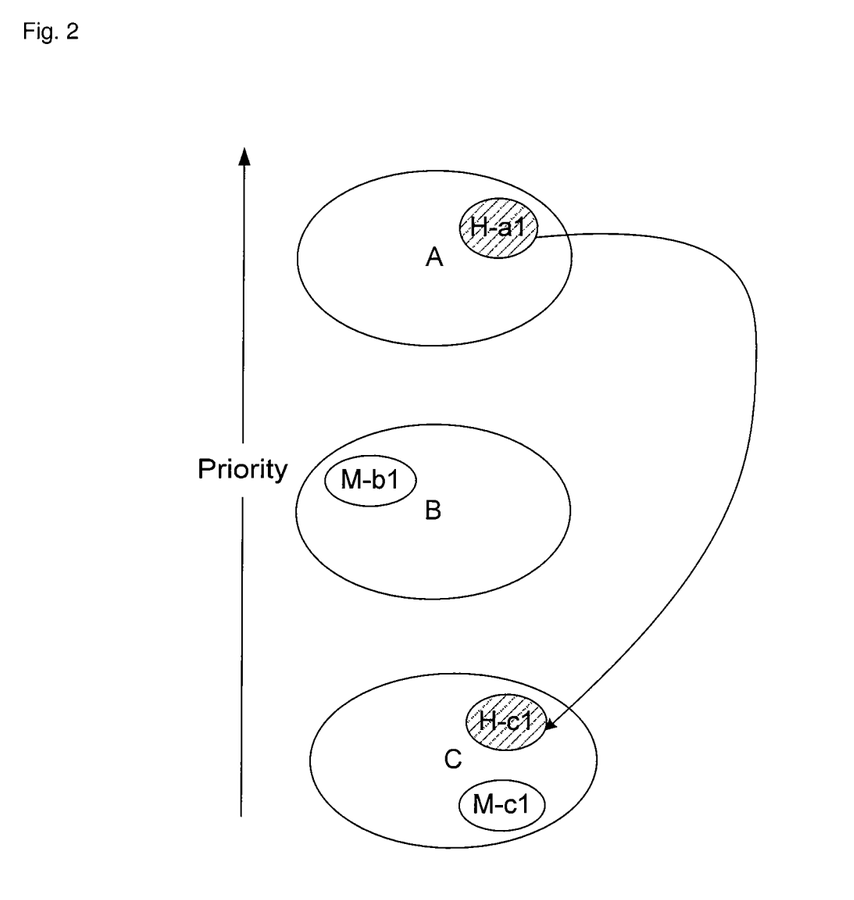
FIG. 2 is a schematic diagram illustrating a priority-based reselection according to an example of the present invention.

Example 1, this example is based on the schematic diagram shown in FIG. 2 which illustrates priority-based reselection; in FIG. 2, a CSG cell is represented by a left oblique-filled area.

A CSG user terminal camping on a CSG cell H_a1 on a frequency of A gets priorities F_b and F_c of another two frequencies B and C through the broadcast, wherein the priority order is as follows: F_a>F_b>F_c. When the CSG user terminal finds a macro cell M_b1 on the frequency B, a CSG cell H_c1 and a macro cell M_c1 are found on the frequency C by scanning the PCI reserved by the CSG, wherein H_a1 and H_c1 belong to the same CSG and have the same CSG identity which can be found in the white list of the user terminal. As the CSG user terminal camps on the H_a1, frequency priority of H_a1 is considered to be the top frequency priority, and F_a is already the top priority currently, therefore no modification is needed. After the H_c1 becomes the best cell on the frequency C, the CSG user terminal lists the H_c1 as a reselectable cell, then the priority of the frequency C becomes the highest, and is set to be F_c' which is equal to F_a, then the priority order of the frequencies is as follows: F_a=F_c'>F_b. In accordance with the priority-based reselection rule, the H_a1 and the H_c1 with the same frequency priority are ranked based on the offset-based cell reselection method, and then the CSG user terminal is reassociated, through the cell reselection, to the CSG cell H_c1 if the condition $R_{H\_c1}>R_{H\text{-}a1}$ is met within a period of time "Treselection".

Example 2, this example is based on the schematic diagram shown in FIG. 2 which illustrates priority-based reselection; in FIG. 2, a CSG cell is represented by a left oblique-filled area.

A CSG user terminal camping on a CSG cell H_a1 on a frequency of A gets priorities F_b and F_c of another two frequencies B and C through the broadcast, wherein the priority order is as follows: F_a>F_b>F_c. When the CSG user terminal finds a macro cell M_b1 on the frequency B, a CSG cell H_c1 and a macro cell M_c1 are found on the frequency C by scanning the PCI reserved by the CSG. H_a1 and H_c1 belong to the same CSG and have the same CSG identity which can be found in the white list of the user terminal. As the CSG user terminal camps on the H_a1, frequency priority of the H_a1 is considered to be the top frequency priority and considered to be F_a' which is higher than any existing defined priority, that is, F_a'>F_a>F_b>F_c. After the H_c1 becomes the best cell on the frequency C, the CSG user terminal lists the H_c1 as a reselectable cell, then the priority of the frequency C becomes the highest and is set to be F_c' which is equal to F_a, then the priority order of the frequencies is as follows: F_a'=F_c'>F_b. In accordance with the priority-based reselection rule, the H_a1 and the H_c1 with the same frequency priority are ranked based on the offset-based cell reselection method, and then the CSG user terminal is reassociated, through the cell reselection, to the CSG cell H_c1 if the condition $R_{H\_c1}>R_{H\text{-}a1}$ is met within a period of time "Treselection".

Figure 3:
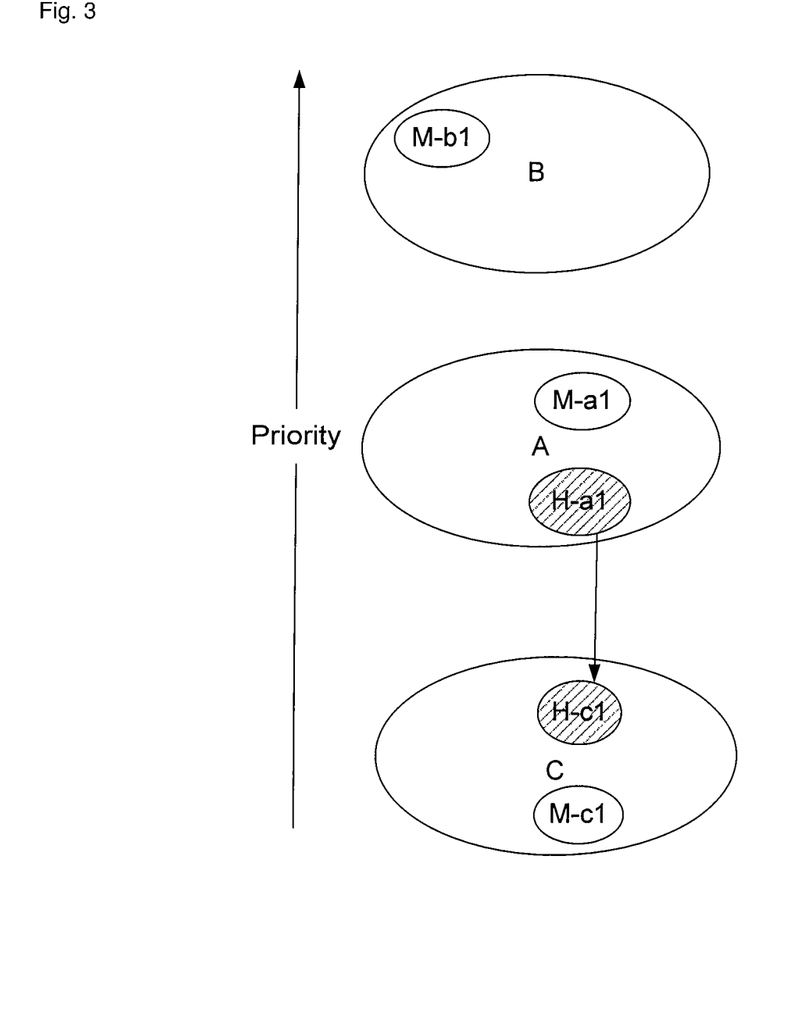
FIG. 3 is a schematic diagram illustrating a priority-based reselection according to an example of the present invention.

Example 3, this example is based on the schematic diagram shown in FIG. 3 which illustrates priority-based reselection; In FIG. 3, a CSG cell is represented by a left oblique-filled area.

A CSG user terminal camping on a CSG cell H_a1 on a frequency of A gets another frequency B through the broadcast, wherein the priority order is set by fault as follows: F_b>F_a. The CSG user terminal also finds another frequency C which is not broadcasted in the H_a1. The CSG user terminal further finds a macro cell M_a1 on the frequency A, a macro cell M_b1 on the frequency B as well as a CSG cell H_c1 and a macro cell M_c1 on the frequency C, wherein H_a1 and H_c1 belong to different CSGs and have different CSG identities which can be found in the white list of the user terminal. As the CSG user terminal camps on the H_a1, the priority of the frequency is reset to be F_a' and there is F_a'>F_b. After the H_c1 becomes the best cell on the frequency C, the CSG user terminal lists the H_c1 as a reselectable cell, then the priority of the frequency C becomes the highest and is set to be F_c' which is equal to F_a', that is, F_a'=F_c'>F_b. In accordance with the reselection rule, the H_a1 and the H_c1 with the same frequency priority are ranked based on the offset-based cell reselection method, and then the CSG user terminal is reassociated, through the cell reselection, to the CSG cell H_c1 if the condition $R_{H\_c1}>R_{H\text{-}a1}$ is met within a period of reselection time "Treselection" of the broadcasting frequency A of the cell H_a1.

Apparently, it should be understood by those skilled in the art that all modules or steps of the present invention can be realized by a universal computing device, they can be centralized on a single computing device or distributed on a network consisting of multiple computing device, and optionally realized by program codes executable to computing devices; thereby the modules or steps can be stored in a storage device to be executed by a computing device or separately made into respective integrated circuit modules, or some of the modules or steps are made into a single integrated circuit module. Thus, the present invention is not limited to any special combination of hardware and software.

The mentioned above is only preferred embodiments of the present invention but not limitation to the present invention, various modification and variations can be devised by those skilled in the art, and it should be understood that any modification, equivalent substitution and improvement etc, devised without departing from the spirit and scope of the present invention, shall belong to the protection scope of the present invention.

The invention claimed is:

1. A method for reselection among home base station cells, comprising:
   a user terminal camping on a Closed Subscriber Group (CSG) cell; when the user terminal is reassociated from a current camped source CSG cell to a target CSG cell through cell reselection, frequencies of the source CSG cell and the target CSG cell being assigned with the same frequency priority, and the user terminal performing the cell reselection;
   wherein the user terminal comprises a CSG user terminal supportive to a CSG capability; and
   wherein the frequencies of the source CSG cell and the target CSG cell can be assigned with the same frequency priority in the following specific frequency priority configuration way: frequency priorities are set based on the fact that the frequencies of the source CSG cell and the target CSG cell are assigned with the same frequency priority, and the priority of the same frequency is set to be higher than those of other frequencies.

2. The method according to claim 1, wherein the source CSG cell and the target CSG cell both allow the user terminal to camp on and both comprise CSG cells listed in a white list of the user terminal, which are accessible to an unauthorized user terminal.

3. The method according to claim 1, wherein the source CSG cell and the target CSG cell have the same or different CSG identities.

4. The method according to claim 1, wherein the frequency of the target CSG cell is a frequency different from that of the source CSG cell.

5. The method according to claim 1, wherein the frequency priority of the target CSG cell is a frequency reselection priority broadcasted by the source CSG cell on which the user terminal currently camps.

6. The method according to claim 1, wherein the other frequencies refer to the frequencies excluding those of the source CSG cell and the target CSG cell; or the other frequencies can be appreciated as frequencies on which no CSG cell exists or on which no CSG cell meets a reselection condition.

7. The method according to claim 1, wherein the step of the user terminal performing the cell reselection is specifically comprises: the reselection is performed by reassociating the user terminal from the source CSG cell to the target CSG cell through the cell reselection using an offset-based cell reselection method.

* * * * *

UNITED STATES PATENT AND TRADEMARK OFFICE
CERTIFICATE OF CORRECTION

PATENT NO.         : 8,660,089 B2                                       Page 1 of 1
APPLICATION NO. : 13/140416
DATED              : February 25, 2014
INVENTOR(S)        : Huang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 108 days.

Signed and Sealed this

Twenty-ninth Day of September, 2015

Michelle K. Lee
*Director of the United States Patent and Trademark Office*